United States Patent
Klimpel

(10) Patent No.: US 9,500,213 B2
(45) Date of Patent: Nov. 22, 2016

(54) RETAINING DEVICE FOR A COMPONENT OF AN AIRCRAFT OR SPACECRAFT

(71) Applicant: Airbus Operations GmbH, Hamburg (DE)

(72) Inventor: Frank Klimpel, Nahefurth (DE)

(73) Assignee: Airbus Operations GmbH, Hamburg (DE)

( * ) Notice: Subject to any disclaimer, the term of this patent is extended or adjusted under 35 U.S.C. 154(b) by 403 days.

(21) Appl. No.: 13/708,182

(22) Filed: Dec. 7, 2012

(65) Prior Publication Data

US 2013/0170894 A1    Jul. 4, 2013

Related U.S. Application Data

(60) Provisional application No. 61/568,664, filed on Dec. 9, 2011.

(30) Foreign Application Priority Data

Dec. 9, 2011 (DE) .......... 10 2011 088 061

(51) Int. Cl.
| | |
|---|---|
| F16B 5/02 | (2006.01) |
| F16B 17/00 | (2006.01) |
| B64G 1/22 | (2006.01) |
| B64G 1/64 | (2006.01) |
| B65D 6/00 | (2006.01) |
| B64D 13/00 | (2006.01) |

(52) U.S. Cl.
CPC ............... *F16B 17/00* (2013.01); *B64G 1/22* (2013.01); *B64G 1/64* (2013.01); *F16B 5/0241* (2013.01); *F16B 5/0266* (2013.01); *B64D 13/00* (2013.01); *B65D 11/00* (2013.01); *Y10T 403/45* (2015.01)

(58) Field of Classification Search
CPC .. F16B 5/0216; F16B 5/0233; F16B 5/0241; F16B 5/0266; F16B 17/00; B64G 1/64; B64G 1/22; B64D 13/00; B64D 13/06
USPC ......... 403/41, 51, 220, 224, 229; 244/171.9; 248/566, 569, 578, 624
See application file for complete search history.

(56) References Cited

U.S. PATENT DOCUMENTS

| | | | | |
|---|---|---|---|---|
| 389,320 | A * | 9/1888 | Pierce | 74/582 |
| 2,520,341 | A * | 8/1950 | Rockola | 248/578 |
| 2,852,223 | A | 9/1958 | Roberts | |
| 2,909,323 | A * | 10/1959 | Cholvin et al. | 236/80 R |
| 3,211,411 | A * | 10/1965 | Rood | 248/566 |
| 3,348,796 | A * | 10/1967 | Baratoff et al. | 248/565 |

(Continued)

FOREIGN PATENT DOCUMENTS

| | | |
|---|---|---|
| DE | 2718543 A1 | 11/1977 |
| DE | 19839701 A1 | 3/2000 |

(Continued)

*Primary Examiner* — Michael P Ferguson
*Assistant Examiner* — Matthew R McMahon
(74) *Attorney, Agent, or Firm* — Greer, Burns & Crain Ltd.

(57) ABSTRACT

A retaining device for a component of an aircraft or spacecraft. The retaining device comprises a fuselage cell portion and a component portion, which portions are interconnected via at least one fastener. A gap is formed between the fastener and the component portion, of such a type that the fuselage cell portion and the component portion are movable relative to one another.

19 Claims, 3 Drawing Sheets

(56) References Cited

U.S. PATENT DOCUMENTS

| | | | | |
|---|---|---|---|---|
| 3,959,898 A | * | 6/1976 | McWatters | 37/334 |
| 4,674,725 A | * | 6/1987 | Popper | 248/562 |
| 4,736,555 A | * | 4/1988 | Nagare et al. | 52/126.6 |
| 5,090,657 A | * | 2/1992 | Dreiman | 248/624 |
| 5,592,814 A | * | 1/1997 | Palusis et al. | 60/770 |
| 5,913,892 A | * | 6/1999 | Kwon | 62/296 |
| 6,047,928 A | * | 4/2000 | Benoliel et al. | 244/172.9 |
| 6,138,967 A | * | 10/2000 | Okamoto | 248/188.1 |
| 6,299,106 B1 | * | 10/2001 | Shorey | 244/171.7 |
| 6,318,672 B1 | * | 11/2001 | Traylor | 244/118.5 |
| 6,488,434 B1 | * | 12/2002 | Graeff | 403/2 |
| 6,499,692 B2 | * | 12/2002 | Kelnhofer | 244/117 R |
| 6,676,101 B2 | * | 1/2004 | Platus | 248/603 |
| 7,568,565 B2 | * | 8/2009 | McFarland et al. | 188/380 |
| 7,677,606 B2 | * | 3/2010 | Rohwedder | 285/262 |
| 8,240,331 B2 | * | 8/2012 | Appleby et al. | 137/527 |
| 8,800,534 B2 | * | 8/2014 | Kannan | 123/469 |
| 9,168,646 B2 | * | 10/2015 | Galota et al. | |
| 9,169,861 B2 | * | 10/2015 | Sasuga | |
| 2008/0111334 A1 | * | 5/2008 | Inoue et al. | 280/124.1 |
| 2011/0070019 A1 | * | 3/2011 | Song et al. | 403/26 |
| 2011/0107851 A1 | * | 5/2011 | Verger | 73/862.41 |
| 2012/0141193 A1 | * | 6/2012 | Harnisch et al. | 403/224 |
| 2012/0141227 A1 | * | 6/2012 | Ye | 411/347 |
| 2012/0193493 A1 | * | 8/2012 | Rekasch | 248/226.11 |

FOREIGN PATENT DOCUMENTS

| | | |
|---|---|---|
| DE | 10035301 C2 | 2/2002 |
| FR | 1050638 A | 1/1954 |
| FR | 2738861 A1 | 3/1997 |

* cited by examiner

RETAINING DEVICE FOR A COMPONENT OF AN AIRCRAFT OR SPACECRAFT

CROSS-REFERENCES TO RELATED APPLICATIONS

This application claims benefit of the U.S. Provisional Application No. 61/568,664, filed Dec. 9, 2011, and of the German Patent Application No. 10 2011 088 061.5, filed Dec. 9, 2011, the entire disclosures of which are incorporated herein by way of reference.

FIELD OF THE INVENTION

The invention relates to a retaining device for a component of an aircraft or spacecraft.

BACKGROUND OF THE INVENTION

In aircraft, retaining devices are used for retaining a wide variety of components; for example, air-conditioning systems, in particular heat exchangers and/or compressors of an air-conditioning system, are fastened to a fuselage structure of an aircraft by means of retaining devices.

DE 100 35 301 C2 discloses a retaining device for an air-conditioning system. This retaining device comprises a suspension frame which extends from the fuselage structure. A plurality of suspension rods extend from the suspension frame and are connected, at their ends remote from the suspension frame, to an air-conditioning system.

The suspension rods can be connected to the air-conditioning system via a ball head construction at the suspension points. The ball head construction allows a deflection of the ball heads in a particular range, in order to compensate a fuselage structure movement. In the case of deflections of the fuselage structure in axial and/or vertical directions owing to a hard landing, for example, structural components made of CFRP can have a greater movability than structural components made of metal. Large movements of structural components can lead to an increase in the reaction forces on system components.

To absorb increased reaction forces, the material thickness of components of the retaining device can be increased. Increasing the material thickness results in an increase in rigidity, and this in turn leads to higher reaction forces owing to a lower flexibility of the components. Alternatively, the number of suspension rods can be reduced, and this increases the movability of the aircraft components. However, a reduction in the number of suspension rods is limited owing to the acceleration forces and the maximum load-bearing capacity of the retaining device. Also, the construction of the retaining device should not be changed fundamentally, since official requirements with respect to safety are met by the number of rods owing to the redundancy.

SUMMARY OF THE INVENTION

One idea of the present invention is to provide a retaining device for a component of an aircraft or spacecraft, which retaining device permits the deflections of the fuselage structure, in particular the deflections of a CFRP fuselage structure which are greater than those of metal fuselage structures, in a large range.

According to the invention, a retaining device for a component of an aircraft or spacecraft is provided and comprises a fuselage cell portion and a component portion. The retaining device is coupled to a fuselage structure of an aircraft or spacecraft by the fuselage cell portion. In addition, the retaining device is coupled to a component of the aircraft or spacecraft by the component portion. The fuselage cell portion and the component portion are interconnected by at least one fastening means. The fastening means and the component portion are formed in such a way that there is a gap between the fastening means and the component portion. The gap is formed or provided in such a way that the fuselage cell portion and the component portion can move relative to one another.

Since the fuselage cell portion and the component portion can move relative to one another owing to the gap, it is ensured in a simple manner that the deflection or movement of the fuselage cell portion and/or of the component portion can take place without reaction forces arising which are directed counter to the movement of the fuselage cell portion and/or of the component portion. The fuselage cell portion is part of the retaining device and/or part of the aircraft fuselage and/or part of the aircraft or spacecraft. Thus, for example in the case of a movement of the fuselage structure, in particular of a CFRP fuselage structure, of the aircraft or spacecraft, the fuselage cell portion can move until the fastening means overcomes the gap and abuts against the component portion. As long as the fastening means has not abutted against the component portion, no reaction forces arise which are directed counter to the movement of the component portion. As a result, providing the gap ensures that, in the case of a deflection of the fuselage cell and/or a movement of the component of the aircraft or spacecraft, no high reaction forces between the retaining device and the fuselage cell arise which could ultimately cause damage to the retaining device and/or the component of the aircraft and spacecraft.

The gap between the fastening means and the component portion is formed in such a way that larger deflections or movements of the fuselage cell portion and/or of the component portion than in the case of the known ball head constructions can take place without reaction forces arising in the opposite direction to the movement.

The movement of the fuselage cell portion can take place in a plane which contains a side of the fuselage cell portion facing the component portion. Similarly, a movement of the component portion can take place in a plane which contains a side of the component portion facing the fuselage cell portion. In this context, the movement of the fuselage cell portion and/or component portion can take place along a longitudinal axis of the aircraft or spacecraft. Of course, the movement of the fuselage cell portion and/or of the component portion can also take place in a direction transverse to the above-mentioned plane or transverse to the longitudinal axis of the aircraft or spacecraft. As a result, by providing the gap, the fuselage cell portion and/or the component portion are able to carry out a three-dimensional movement, for example a wave movement.

A movement of the fuselage cell portion can take place as a result of a movement of the fuselage structure of the aircraft or spacecraft, for example owing to a change in temperature and/or loading of the fuselage structure in the case of a hard landing. A movement of the component portion can result from movements of the component of the aircraft or spacecraft, which component is retained by the retaining device, for example owing to vibration of a compressor of an air-conditioning system of the aircraft or spacecraft.

In a preferred embodiment, the fastening means, which can be formed as a screw, can extend through an opening in the component portion. In this context, the gap is formed between a peripheral face of the fastening means and a peripheral wall of the opening, which wall faces in the direction of the peripheral face of the fastening means. The fastening means can be connected at one end to the fuselage cell portion, in particular via a screw connection, such that the fastening means moves together with the fuselage cell portion. Until the fastening means has overcome the gap and abuts against the component portion, the movement of the fuselage cell portion and thus of the fastening means can take place without force transmission to the component portion and without a reaction force arising. In the same way, the component portion can move relative to the fuselage cell portion and the fastening means until the component portion, in particular the peripheral wall of the opening in the component portion, abuts against the fastening means.

In the event that the movement of the fuselage structure of the aircraft or spacecraft and/or the movement of the component of the aircraft or spacecraft is large enough that the gap between the fastening means and the component portion is overcome, at least one fastening means can be formed in such a way that it breaks before the component to be retained of the aircraft or spacecraft is damaged. Owing to the breakage of the fastening means, excess loading of the retaining device is easily visible for the user.

The component portion can be connected to the fuselage cell portion by a plurality of fastening means. The fastening means can be formed in such a way that they break at different loads. It is thus ensured in a simple manner that, in the case of overloading of the retaining device, said device can continue to perform its retaining function for a component of the aircraft and spacecraft by way of the non-broken fastening means.

In a further embodiment, the fastening means can comprise a ball head which interlocks with the fuselage cell portion in a movable manner. In this context, if the gap between the fastening means and the component portion is overcome, a tipping movement of the fastening means about the center of the ball head is initiated, which movement is reversible. It is thus ensured in a simple manner that, in the case of overloading of the retaining device, said device can continue to perform its retaining function for a component of the aircraft and spacecraft by way of the tipped fastening means, without parts subsequently having to be replaced. Alternatively, the tipping movement can also be provided for the movement of the fuselage structure of the aircraft or spacecraft and/or the movement of the component of the aircraft or spacecraft in the normal operating state. The fastening means can then, analogously to the preceding embodiment, be formed in such a way that one or more fastening means break in the case of overloading.

The fuselage cell portion and/or the component portion can be formed in such a way that a cavity is formed between the two components. The cavity makes it possible for the fuselage cell portion to move transverse to a plane which contains the side of the fuselage cell portion facing the component portion. In addition, the cavity makes it possible for the component portion to move transverse to a plane which contains the side of the component portion facing the fuselage cell portion. As a result, providing the cavity makes possible a movement of the fuselage cell portion and/or of the component portion along the above-mentioned direction, without a reaction force arising in the opposite direction to the respective movement. The reaction force only arises when the fuselage cell portion and/or the component portion have overcome the cavity and meet one another.

A first tensioning means, in particular a first spring, can be provided on the fastening means in a region which can correspond to the cavity. In addition, a second tensioning means, in particular a second spring, can be provided on the fastening means between the end of the fastening means which faces away from the fuselage cell portion and a side of the component portion which faces away from the fuselage cell portion. The first and second tensioning means can prevent a movement of the fuselage cell portion and/or component portion up to a predetermined force, for example 10,000 N. In addition, the first and second tensioning means act on the component portion and/or fuselage cell portion in such a way that a starting position of the retaining device is set after a deflection of the fuselage cell portion and/or the movement of the component portion.

In the starting position it is ensured that the gap is formed between the fastening means and the component portion. In addition, in the starting position it is ensured that the cavity is formed between the fastening means and the component portion.

The first and/or second tensioning means can each be supported by at least one end on a centering element, in particular a dome-shaped shell. The centering element can be arranged at the ends of the first and/or second tensioning means facing the component portion. Each centering element comprises an aperture through which the fastening means extends and which is larger than the opening in the component portion, such that the centering element rests against the component portion. By providing a dome-shaped shell as a centering element, the movability of the respective fastening means is improved.

In addition, in a preferred embodiment a recess can be provided in the fuselage cell portion. The recess can be used for guiding a piston which is located in the recess, at least in part. The piston can be displaced, in particular linearly, relative to the fuselage cell portion and can be in direct contact with the component portion. At the end thereof remote from the component portion, the piston can be coupled to a spring means. The spring means is provided inside the recess in the fuselage cell portion and is supported on the fuselage cell portion by the end remote from the piston.

The piston can be convex or concave at its end facing the component portion. Accordingly, the component portion can comprise a correspondingly concave or convex receiving means for receiving the end of the piston. In this context, at least the concave or convex end of the piston extends in the cavity between the fuselage cell portion and the component portion. By providing the piston, it is achieved in a simple manner that, after a deflection of the fuselage cell portion and/or of the component portion, the two portions are moved into the starting position.

A bellows can be coupled to the fuselage cell portion and the component portion and enclose the cavity between the fuselage cell portion and the component portion. In a simple manner, this prevents contamination particles from coming between the fuselage cell portion and the component portion.

At least one damping means can be arranged on the side of the component portion facing the fuselage portion. By way of the damping means, it is possible to damp in a simple manner an encounter between the fuselage cell portion and the component portion. In this context, the damping means can comprise a sensor, by means of which an encounter between the fuselage cell portion and the component portion is detected. In the event of a collision of the two portions, an output signal can be output which informs the user about the collision.

The retaining device can be used in an aircraft or spacecraft. In particular, the component portion can comprise a retaining region which is coupled to an air-conditioning system of the aircraft or spacecraft, in particular to a compressor and/or a heat exchanger.

BRIEF DESCRIPTION OF THE DRAWINGS

The subject-matter of the invention is shown schematically in the figures and described below by means thereof, like or functionally like elements being provided with the same reference signs.

In the figures.

DETAILED DESCRIPTION OF THE PREFERRED EMBODIMENTS

Figure 1:
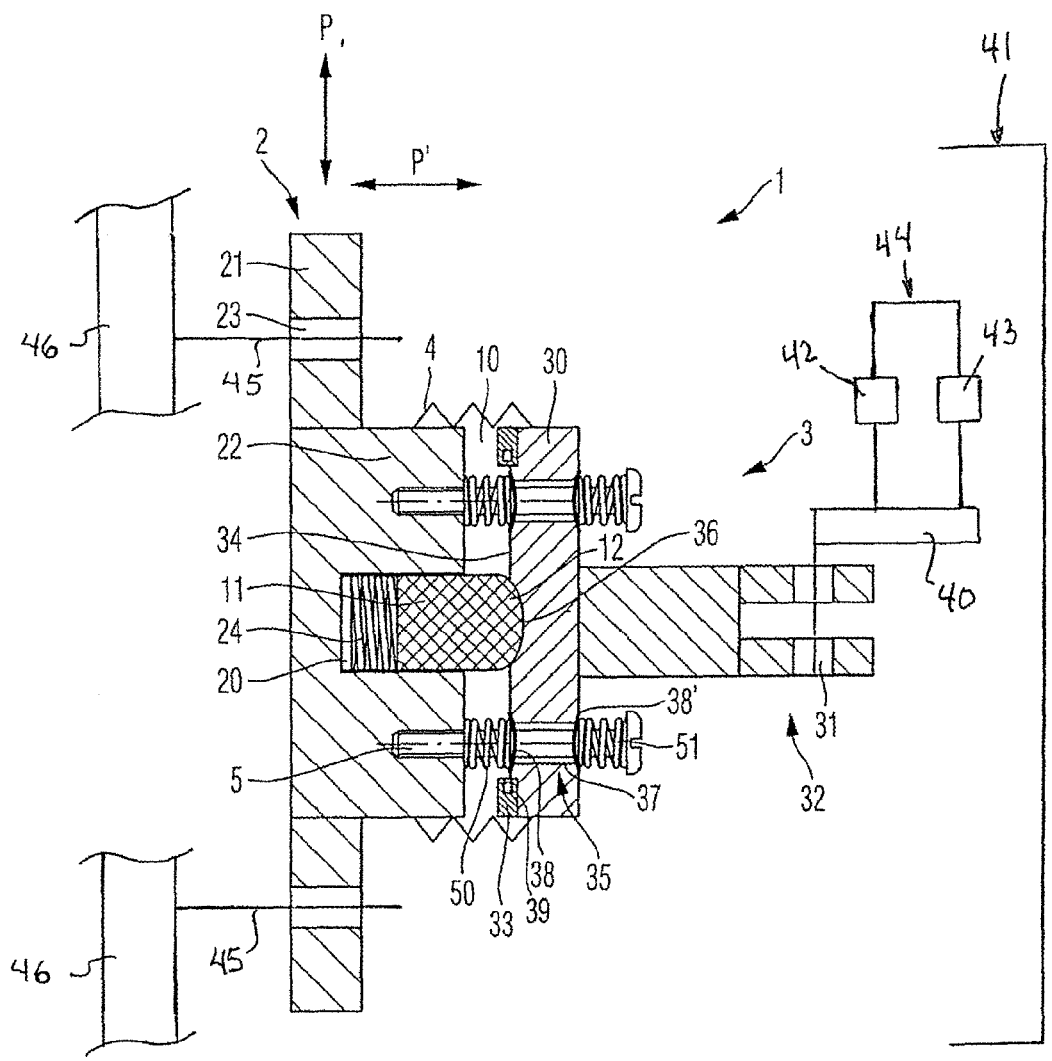
FIG. 1 is a sectional view through the retaining device.

The retaining device 1 shown in FIG. 1 comprises a fuselage cell portion 2 and a component portion 3. The fuselage cell portion 2 comprises a primary portion 21 in which a plurality of holes 23 is provided. By means of the holes 23 and further connecting means 45, the fuselage cell portion 2 is connected to a fuselage structure 46 of an aircraft or spacecraft 41. A portion 22 extends from a central region of the primary portion 21 towards the component portion 3 and projects from the primary portion 21. A recess 20 is provided in the projecting portion 22, inside which recess a piston 11 is arranged, at least in part.

The piston 11 is displaceable inside the recess 20 relative to the fuselage cell portion 2. A spring means 24 is provided inside the recess and is coupled at one end to the piston 11. The spring means 24 is supported by the end thereof remote from the piston 11 on the fuselage cell portion 2. The piston 11 comprises, at the end thereof remote from the spring means 24, a dome-shaped end 12 which is in direct contact with the component portion 3.

The component portion 3 comprises a base portion 30 and a retaining region 32 which projects from the base portion 30 in a direction away from the fuselage cell portion 2. The retaining region 32 comprises, at the end thereof remote from the base portion 30, a component seat 31 for receiving a component 40 of an aircraft or spacecraft 41, for example a heat exchanger 42 and/or compressor 43 of an air-conditioning system 44 of the aircraft or spacecraft 41. A cavity 10 is formed between the fuselage cell portion 2 and the component portion 3. The cavity 10 is enclosed by a bellows 4 which is coupled to the fuselage cell portion 2 and to the component portion 3.

A damping means 33 is arranged on a side 34, facing the fuselage cell portion 2, of the component portion 3, in particular the base portion 30. The damping means 33 is used to damp a collision between the fuselage cell portion 2 and the component portion 3 if the fuselage structure of the aircraft or spacecraft and/or the component of the aircraft or spacecraft moves. By way of the damping means 33, it is possible to damp in a simple manner an encounter between the fuselage cell portion 2 and the component portion 3. In this context, the damping means 33 can comprise a sensor 39, by means of which an encounter between the fuselage cell portion 2 and the component portion 3 is detected. In the event of a collision of the two portions, an output signal can be output which informs the user about the collision. The base portion 30 comprises, on the side 34 thereof facing the fuselage cell portion 2, a dome-shaped recess 36. The dome-shaped recess 36 is formed in such a way that it can receive the dome-shaped end of the piston 11, at least in part. This means that the piston 11 is in contact with the component portion 3 via the dome-shaped recess 36.

The component portion 3 is connected to the fuselage cell portion 2 via a plurality of fastening means, for example screws 5. To be more precise, the screws 5 are coupled by one end to an internal thread provided in the projecting portion 22. In addition, the screws 5 extend through an opening 35 in the component portion 3, in particular in the base portion 30. The opening 35 and the screws 5 are formed in such a way that a gap 37 is formed between a peripheral surface of the screw 5 and a peripheral wall of the opening 35. Owing to the provision of the gap 37, the fuselage cell portion 2, together with the screw 5, and the component portion 3 are movable relative to one another. The part of the screw 5 which extends through the opening 35 in the component portion 3 has no external thread.

A first spring 50 is arranged on the screw 5 and is supported by one end against the fuselage cell portion 2 and by the other end against a dome-shaped shell 38. The shell 38 is larger than the opening 35 and rests against the base portion 30. The first spring 50 is arranged on a portion of the screw 5 which extends through the cavity 10. In addition, a second spring 51 is arranged on the screw 5. The second spring 51 is supported at one end on a further shell 38'. Analogously to the shell 38, the further shell 38' is larger than the opening 35 and rests against the base portion 30. The shell 38 and the further shell 38' are arranged at opposite ends of the base portion 30. In addition, the second spring 52 is supported at the end thereof facing away from the component portion 3 by a screw head of the screw 5.

Figure 2:
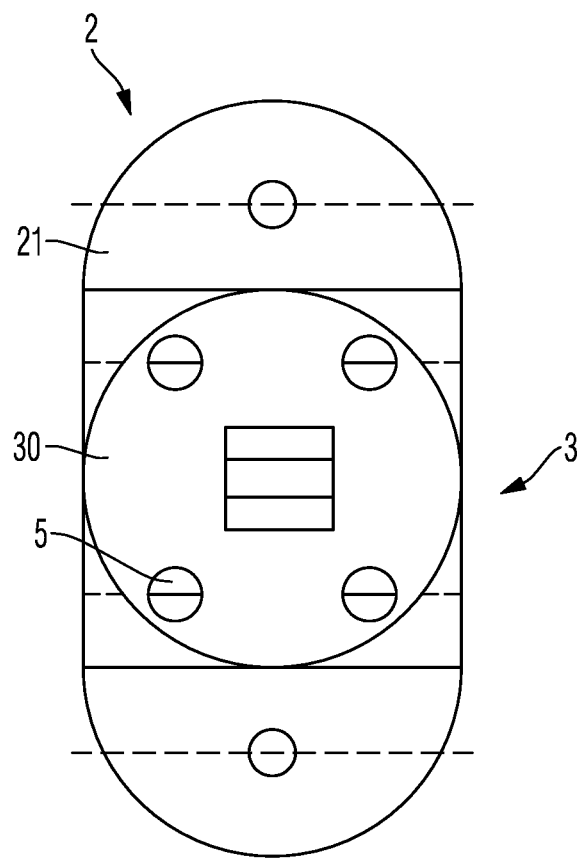
FIG. 2 is a front view of the retaining device.

FIG. 2 is a front view of the retaining device 1. As can be seen from this figure, the primary portion 21 of the fuselage cell portion 2 has an oval shape. The base portion 30 of the component portion 3 is circular and is connected to the fuselage cell portion 2 by means of four screws 5.

The functionality of the retaining device 1 will briefly be described below. Although the functionality is described using the reference signs, the invention is not limited to the retaining device 1 shown in the figures. Only one movement of the fuselage cell portion 2 along the arrow direction P, P' is discussed below. Of course, the retaining device functions in the same way when it is not the fuselage cell portion 2 on its own, but rather the component portion 3, on its own or together with the fuselage cell portion 2, which is moved. In addition, the retaining device functions in the same way even in cases in which the fuselage cell portion 2 and/or the component portion 3 are moved in a direction other than the direction P, P' shown in FIG. 1.

In the case of a movement of the fuselage structure of the aircraft or spacecraft, this movement is transmitted to the fuselage cell portion 2 via the connecting means (not shown in the figures). The movement of the fuselage cell portion 2 can take place for example along the directions P, P' shown in FIG. 1. In the case of a movement of the fuselage cell portion 2 in direction P, the screws 5 which are connected to the fuselage cell portion 2 move in the same direction P as the fuselage cell portion 2.

In this context, the fuselage cell portion 2 can move relative to the component portion 3 until the screw 5 abuts against the component portion 3. As long as the screw 5 does not abut against the component portion, no reaction forces arise which are directed counter to the movement of the fuselage cell portion 2 in direction P. This means that the fuselage cell portion 2 can move relative to the component portion 3 until the screw 5 abuts against the component portion 3. After a deflection of the fuselage cell portion, the piston 11 ensures that the starting position of the retaining device 1 is set.

The springs 50, 51 resist a deflection of the fuselage cell portion 2 in direction P'. Only when a force applied owing to the deflection of the fuselage cell portion 2 exceeds a predetermined value does the fuselage cell portion 2 move in direction P'. In the case of this movement of the fuselage cell portion 2, the springs 50 and 51 are tensioned. Of course, the movement of the fuselage cell portion 2 towards the component portion is possible only until the two portions collide. Only from this point on is there a corresponding reaction force opposing a further movement of the fuselage cell portion. In this context, the collision between the two portions is damped by the damping means 33. In addition, in the case of the movement of the fuselage cell portion 2 towards the component portion 3, the spring means 24 is tensioned. This happens because the piston 11 is in contact with the component portion 3 and is therefore not moved with the fuselage cell portion 2, or rather the fuselage cell portion 2 moves relative to the piston 11.

After a deflection of the fuselage cell portion 2, the piston 11 and the springs 50, 51 ensure that the starting position of the retaining device 1 is set.

Figure 3:
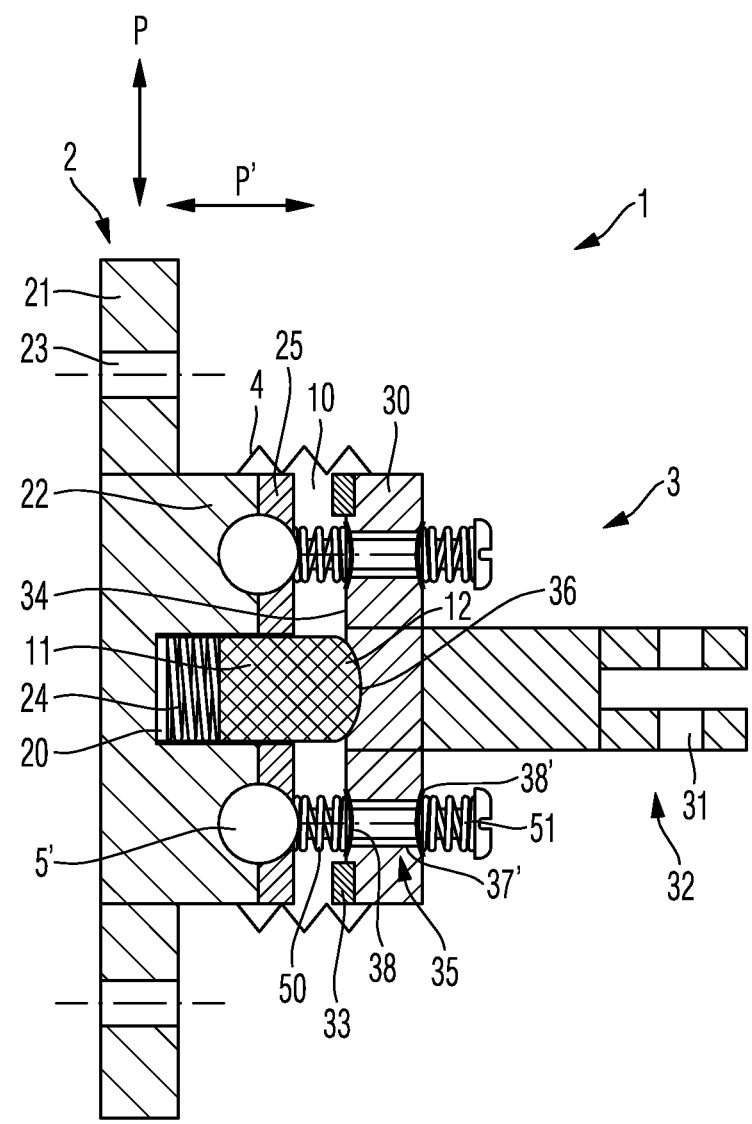
FIG. 3 is a sectional view through an alternative embodiment of the retaining device.

FIG. 3 is a sectional view through an alternative embodiment of the retaining device.

Therein, the ball head bolts 5', which comprise a ball head at the end thereof facing the fuselage cell portion, interlock with the fuselage cell portion 2 in a movable manner by means of a ball head seat 25.

In the case of a movement of the fuselage cell portion 2 in direction P, the ball head bolts 5' which are connected to the fuselage cell portion 2 tip in direction P in which the fuselage cell portion 2 moves. In this context, the fuselage cell portion 2 can move relative to the component portion 3 until the ball head bolt 5' abuts against the component portion 3 at two opposing points in the opening 35'. As long as the ball head bolt 5' does not abut against the component portion at two opposing points in the opening 35', then apart from the resistance of the ball head during tipping no reaction force arises which is directed counter to the movement of the fuselage cell portion 2 in direction P. This means that the fuselage cell portion 2 can move relative to the component portion 3 until the ball head bolt 5' abuts against the component portion 3 at two opposing points in the opening 35'. After a deflection of the fuselage cell portion, the piston 11 ensures that the starting position of the retaining device 1 is set. The lateral movability of the base portion 30 in particular is thus extended by the additional tipping movement of the ball head bolts 5'.

If the lateral movability in this extended scope is not required, the diameter of the opening 35 can optionally be reduced such that there is a smaller gap 37' in comparison to the gap 37 in the first embodiment. A maximum possible tipping angle of the ball head bolt 5' is thus reduced and at the same time the possible movement in direction P without the ball head bolt 5' contacting the component portion 3 is reduced. The movability is further reduced overall as a result. The movability can be set in particular to the same measure as in the embodiment in FIG. 1.

Although the invention has been described herein with reference to the figures, it is not restricted thereto, but can be modified in many different ways.

For example, screws and/or ball head bolts do not have to be used; instead, further fastening means can be used, by means of which positive locking with the fuselage cell portion is achieved and it is simultaneously ensured that the fuselage cell portion and the component portion can move relative to one another.

Also, the piston does not have to have a dome-shaped end. However, the piston must be formed in such a way that it ensures that the retaining device is brought into its starting position after a force introduction. The design of the piston is intended to centre the retaining device, the springs resetting the starting position in direction P. For example, a spherical dome shape of the piston can perform this function and allow a deflection of the component portion in the lateral direction.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A retaining device for a component of an aircraft or spacecraft, comprising:
   a fuselage cell portion configured and arranged to couple the retaining device to a fuselage cell of the aircraft or spacecraft;
   a component portion configured and arranged to couple the retaining device to the component of the aircraft or spacecraft; and
   a plurality of fasteners which interconnects the component portion and the fuselage cell portion, a gap being provided between each of the fasteners and the component portion in such a way that the fuselage cell portion and the component portion are three-dimensionally movable relative to one another,
   wherein a recess is provided in the fuselage cell portion, in which recess a piston is arranged which is displaceable relative to the fuselage cell portion, the piston being in contact with the component portion.

2. The retaining device according to claim 1, wherein each of the fasteners extends through an opening in the component portion, the gap being formed between a peripheral face of the fastener and a peripheral wall of the opening, which wall faces in the direction of the peripheral face of the fastener.

3. The retaining device according to claim 1, wherein a cavity is formed between the fuselage cell portion and the component portion.

4. The retaining device according to claim 3, wherein a bellows is provided which is connected to the fuselage cell portion and the component portion and encloses the cavity.

5. The retaining device according to claim 1, wherein a first tensioner is provided on each of the fasteners in a portion between the fuselage cell portion and the component portion.

6. The retaining device according to claim 5, wherein a second tensioner is arranged on each of the fasteners between the end of the fastener which faces away from the fuselage cell portion and a side of the component portion which faces away from the fuselage cell portion.

7. The retaining device according to claim 6, wherein the first tensioner and/or the second tensioner are supported by at least one end on a centering element.

8. The retaining device according to claim 7, wherein the centering element comprises a dome-shaped shell.

9. The retaining device according to claim 5, wherein the first tensioner comprises a first spring.

10. The retaining device according to claim 1, wherein the piston is convex or concave at the end thereof facing the component portion and the component portion comprises a receiver, which is concave or convex in accordance with the end of the piston, for receiving the end of the piston.

11. The retaining device according to claim 1, wherein a spring is provided inside the recess and is supported by one end on the piston and by the other end on the fuselage cell portion.

12. The retaining device according to claim 1, wherein a damper is arranged on a side of the component portion facing the fuselage cell portion.

13. The retaining device according to claim 12, wherein the damper comprises a sensor which detects a collision between the fuselage cell portion and the component portion.

14. The retaining device according to claim 1, wherein each of the fasteners is formed as a screw or as a ball head bolt.

15. The retaining device according to claim 1, wherein the component portion comprises a retaining region which is configured to be coupled to an air-conditioning system of an aircraft or spacecraft.

16. The retaining device according to claim 1, wherein the retaining region is configured to be coupled to one of a heat exchanger and a compressor of the air-conditioning system.

17. The retaining device according to claim 1, wherein the piston is arranged linearly displaceable.

18. An aircraft or spacecraft comprising at least one fuselage cell and comprising at least one retaining device for a component of the aircraft or spacecraft, the retaining device comprising:

a fuselage cell portion for coupling the retaining device to the fuselage cell of the aircraft or spacecraft;

a component portion for coupling the retaining device to the component of the aircraft or spacecraft; and a plurality of fasteners which interconnect the component portion and the fuselage cell portion, a gap being provided between each of the fasteners and the component portion in such a way that the fuselage cell portion and the component portion are three-dimensionally movable relative to one another, wherein a recess is provided in the fuselage cell portion, in which recess a piston is arranged which is displaceable relative to the fuselage cell portion, the piston being in contact with the component portion.

19. The aircraft or spacecraft according to claim 18, wherein the fuselage cell portion contains CFRP (Carbon Fiber Reinforced Polymer).

\* \* \* \* \*